(12) United States Patent
Ceracchini

(10) Patent No.: US 9,899,058 B2
(45) Date of Patent: Feb. 20, 2018

(54) METHOD FOR THE REPRODUCTION OF A FILM

(71) Applicant: MAIOR Srl, Rome (IT)

(72) Inventor: Gabriele Ceracchini, Rome (IT)

(73) Assignee: MAIOR SRL, Rome (IT)

(*) Notice: Subject to any disclaimer, the term of this patent is extended or adjusted under 35 U.S.C. 154(b) by 175 days.

(21) Appl. No.: 14/786,610

(22) PCT Filed: Apr. 23, 2014

(86) PCT No.: PCT/IB2014/000600
§ 371 (c)(1),
(2) Date: Oct. 23, 2015

(87) PCT Pub. No.: WO2014/174359
PCT Pub. Date: Oct. 30, 2014

(65) Prior Publication Data
US 2016/0064038 A1    Mar. 3, 2016

(30) Foreign Application Priority Data

Apr. 23, 2013 (IT) .............................. RM2013A0244

(51) Int. Cl.
*H04N 5/92* (2006.01)
*H04N 5/84* (2006.01)
(Continued)

(52) U.S. Cl.
CPC ............ *G11B 27/105* (2013.01); *G11B 27/02* (2013.01); *H04N 21/8541* (2013.01)

(58) Field of Classification Search
USPC ................................ 386/326, 334–336, 353
See application file for complete search history.

(56) References Cited

U.S. PATENT DOCUMENTS 6,678,359 B1 * 1/2004 Gallick ................. H04M 1/575
                                                379/88.17
8,758,111 B2 * 6/2014 Lutnick ............... G07F 17/3276
                                                273/292
(Continued)

FOREIGN PATENT DOCUMENTS

WO     WO 03/021956 A2     3/2003
WO     WO 2005/081249 A1    9/2005
(Continued)

OTHER PUBLICATIONS

International Search Report (PCT/ISA/210) dated Oct. 19, 2015, by the European Patent Office as the International Searching Authority for International Application No. PCT/IB2014/000600.
(Continued)

*Primary Examiner* — Nigar Chowdhury

(74) *Attorney, Agent, or Firm* — Buchanan Ingersoll & Rooney PC

(57) ABSTRACT

The present invention relates to a method for the reproduction, through an audio/visual means, of a film and an apparatus for the reproduction of the same. More particularly, the method according to the present invention allows more viewings of the same film such that the film itself is automatically composed as to be different at each viewing. The method for the reproduction of a film is finalized to the creation of a "multifilm", i.e. a film that changes its plot in every reproduction.

18 Claims, 7 Drawing Sheets

(51) Int. Cl.
    *H04N 5/89*      (2006.01)
    *G11B 27/10*     (2006.01)
    *H04N 21/8541*   (2011.01)
    *G11B 27/02*     (2006.01)

(56) References Cited

U.S. PATENT DOCUMENTS

| | | |
|---|---|---|
| 2003/0046638 A1 | 3/2003 | Thompson |
| 2007/0253303 A1 | 11/2007 | Kordjani et al. |
| 2008/0212931 A1 | 9/2008 | Pellerin et al. |
| 2010/0021125 A1 | 1/2010 | Ingrosso et al. |

FOREIGN PATENT DOCUMENTS

| | | |
|---|---|---|
| WO | WO 2005/124783 A1 | 12/2005 |
| WO | WO 2008/035022 A1 | 3/2008 |

OTHER PUBLICATIONS

Notification of Transmittal of the International Preliminary Report on Patentability (Forms PCT/IPEA/416 and PCT/IPEA/409) dated Mar. 1, 2016, by the European Patent Office in corresponding International Patent Application No. PCT/IB2014/000600. (6 pages).

\* cited by examiner

METHOD FOR THE REPRODUCTION OF A FILM

DESCRIPTION

The present invention relates to a method for the reproduction, through an audio/visual means, of a film and an apparatus for the reproduction of the same. More particularly, the method according to the present invention allows more viewings of the same film such that the film itself is automatically composed as to be different at each viewing.

BACKGROUND OF THE INVENTION

As known from the days when cinema began, any film produced with usual methods will be always identical to itself. All movies made today have a beginning, develop a plot and come to an end. If the same film is viewed lots of times, it is evident that the film will be always identical to itself.

Similarly, "television series" are generally composed of a "first" episode (or pilot), a number of subsequent episodes, each of which individually produced (usually with high costs) whose fruition of the user must necessarily follow a certain order, i.e. from the first to the last episode.

SUMMARY

According to one embodiment of the present invention, there is provided a method of reproduction of a film, comprising the generation of at least two strings of events, each string being associated with a respective playback and comprising a sequence of at least a pair of events n, n+1, in which each event corresponds to an audiovisual content recorded on a storage medium.

More particularly, the method comprises the steps of 1. reproducing on an audio/visual means the first event and 2. reproducing on the audio/visual means the second event n+1, subsequent to the first event n. The first n and/or second event n+1 being each automatically selected among a plurality of respective alternative events $n_A$, $n_B$; $n+1_A$, $n+1_B$, the selection being effected in such a way as to maintain logical coherence between said subsequent two events n, n+1.

According to an aspect of the invention, as it will be illustrated in detail in the description of preferred embodiments, the film includes events of a first type $n_P$ and second type $n_S$ such that the selection of one or more events of the first type np in one or more strings of events, authorizes the selection, during the generation of subsequent strings, of one or more events of the second type $n_S$ correlated to said one or more events of the first type $n_P$, selection that would otherwise be prohibited.

According to an aspect of the invention, a method is provided for the reproduction of a film wherein the first n and/or the second event n+1 are selected among said plurality of respective alternative events $n_A$, $n_B$; $n+1_A$, $n+1_B$ randomly or pseudo-randomly.

According to a further aspect of the present invention, it is provided a method for the reproduction of a film wherein the first and/or the second event n+1 are selected among said plurality of respective alternative events $n+1_A$, $n+1_B$ based, at least in part, to a predetermined criterion.

According to a further aspect of the present invention, it is provided a method for the reproduction of a film comprising a step of storing the selection of the first n and/or the second event n+1 among the plurality of respective alternative events $n_A$, $n_B$; $n+1_A$, $n+1_B$ and to create a historical archive of selected events n, n+1 and reproduced during reproductions of the film.

According to a further aspect of the present invention, it is provided a method for the reproduction of a film in which said predetermined criterion for the selection of events n, n+1 to be reproduced is associated with the historical archive of previous selections.

According to a further aspect of the present invention, it is provided a method for the reproduction of a movie where the predetermined criterion comprises the selection of one or more events $n_S$, $n+1_S$ for their reproduction only upon the occurrence of one or more predetermined conditions.

According to a further aspect of the present invention, it is provided a method for the reproduction of a movie wherein the conditions comprise the occurrence of the selection of one or more predefined events, $n_P$, $n+1_P$.

According to a further aspect of the present invention, it is provided a method for the reproduction of a film in which each selectable event for the reproduction is associated with a probability index i of selection, the index being configured so as to decrease the probability of selection of the corresponding event as the number of selections of the same during one or more reproduction of the film increases.

According to a further aspect of the present invention, it is provided a method for the reproduction of a film, in which each event n, n+1 is associated with a cinematographic scene previously shot. According to a still further aspect of the present invention, it is provided an apparatus for the reproduction of a film, comprising means adapted to perform a method as specified above.

It also provided a computer program comprising one or more instructions which, when executed on a processor, are apt to carry out a method as described above. Is also provided a storage medium, comprising such instructions for a processor.

It is finally provided a storage medium comprising a film comprising a sequence of at least a pair of events n, n+1 wherein each event corresponds to an audio/visual content, wherein the first n and/or second event n+1 comprise respective alternative events $n_A$, $n_B$; $n+1_A$, $n+1_B$, the latter being automatically selected to operate a reproduction of the film on an audio/visual means.

At the present state of technology, most of audiovisual products (generally realized bearing high costs) remain products of the "disposable" kind. In other words, in the case of TV series an episode is generally viewed only once before moving to the next episode, while in case of a film, once viewed, it is generally not subject to further subsequent viewings from the user, who generally prefers to enjoy a new, different, film.

Of course the film can be viewed again; but it will always be the same.

To this disadvantage modern technique has attempted to provide different solutions—but not free of drawbacks—which prevented their spread and success among the audience—such as the "interactive movie." In this kind of movie, the plot evolves differently according to the choices/preferences operated by the user during the viewing. In other words, the viewer has to make choices (usually multiple) according to which the film evolves in a different way.

In this case the film actually changes during subsequent viewings, as it may be viewed again making different choices thus exploring different evolutions of the same plot. Nevertheless, the problem is that the implementation of each alternative path in an interactive movie involves, in general, a considerable economic investment and therefore these paths are typically provided in an extremely limited number.

For such reason, an interactive movie as it is currently known is destined, most probably, to exhaust any "diversities" within a few viewings. This is also caused by the fact that the choices to vary the evolution of the plot are actively operated by the user, and therefore such choices will never be numerous.

It is also important to emphasize that, in the production of a normal film according to the known art, the productive effort of companies currently operating in the audiovisual sector is not optimized, as only a small portion of the material produced is actually used to deliver the final version of the film or the TV episode, with obvious waste of resources. The rest of the material produced (such as various sequences that are not chosen for the final editing or cutting of scenes etc.), which is generally consistent, is thrown away.

Purpose of the present invention is to overcome the above-mentioned drawbacks by providing a method for the reproduction of a film as substantially defined in claim 1. Further object of the present invention is to provide an apparatus for the reproduction of a film as substantially defined in claim 10.

Further object of the present invention is to provide a computer program for the reproduction of a film as substantially defined in claim 11. Further object of the present invention is to provide a storage medium as substantially defined in claim 12. Further object of the present invention is to provide a storage medium as substantially defined in claim 13.

Further preferred characteristics are defined in the corresponding dependent claims.

The present invention, overcoming the above mentioned technical problems of the prior art, involves numerous and evident advantages. According to a preferred aspect of the present invention, the method for the reproduction of a movie is finalized, as will become clear from the detailed description of a preferred embodiment shown here by way of a non-limiting example, the creation of a "multifilm", i.e. a film that changes its plot in every reproduction, without the viewer necessarily having to take an active role for varying the plot of the film.

More in particular the method, according to preferred embodiments, is adapted in a manner to allow the film to automatically vary its plot in each viewing, for a number of viewings so high as to make it very difficult, if not impossible, that a viewer can actually exhaust all its forms. The multifilm, as will become clear later, it is not meant to be seen only once, but as many as a user wishes. It can vary its plot randomly or pseudo-randomly (by means of a computer program), and it is assembled, every time it is reproduced on an audio-visual means, according to a different randomly drawn among all possible ones, which are, as before indicated, extremely numerous.

More specifically, the multifilm does not exhaust its narrative potential in a single viewing. As will become apparent from a detailed description of a preferred embodiment, as the number of viewings increases the general understanding, by the viewer, of the narrated story which, in addition to be unfold each time in a different way, may also leave unanswered questions, such as the antecedent of the film, the reason why some characters have a certain behavior, what is the backstage, which can only be resolved through subsequent viewings of the multifilm.

Depending on how the cinematographic narrative material of the film is arranged for reproduction, the narrated story, apart from changing, may evolve in a particular direction, which may coincide with the goal of the protagonist. For example, in a story based on a revenge in which a weak protagonist is forced to confront a stronger antagonist, perishing consistently, in subsequent viewings the protagonist may learn from the past mistakes and gradually become stronger (or more aware) and succeed at the end (there may be many endings but only one can be identified as a "grand finale") in its intent, predetermined from the first viewing.

The method according to the invention makes the creation of such multifilm possible, realized in a way as to be able to propose a different narrative development practically in every viewing, with a reasonable amount of cinematographic material, produced by filming methods used for the productions of films according to the known technique.

BRIEF DESCRIPTION OF THE DRAWINGS

Still further advantages, as well as features and ways of carrying out the present invention will become apparent from the following detailed description of a preferred embodiment, presented by way of a non-limiting example, making reference to the figures of the accompanying drawings, in which.

DETAILED DESCRIPTION OF THE DRAWINGS

Figure 1:
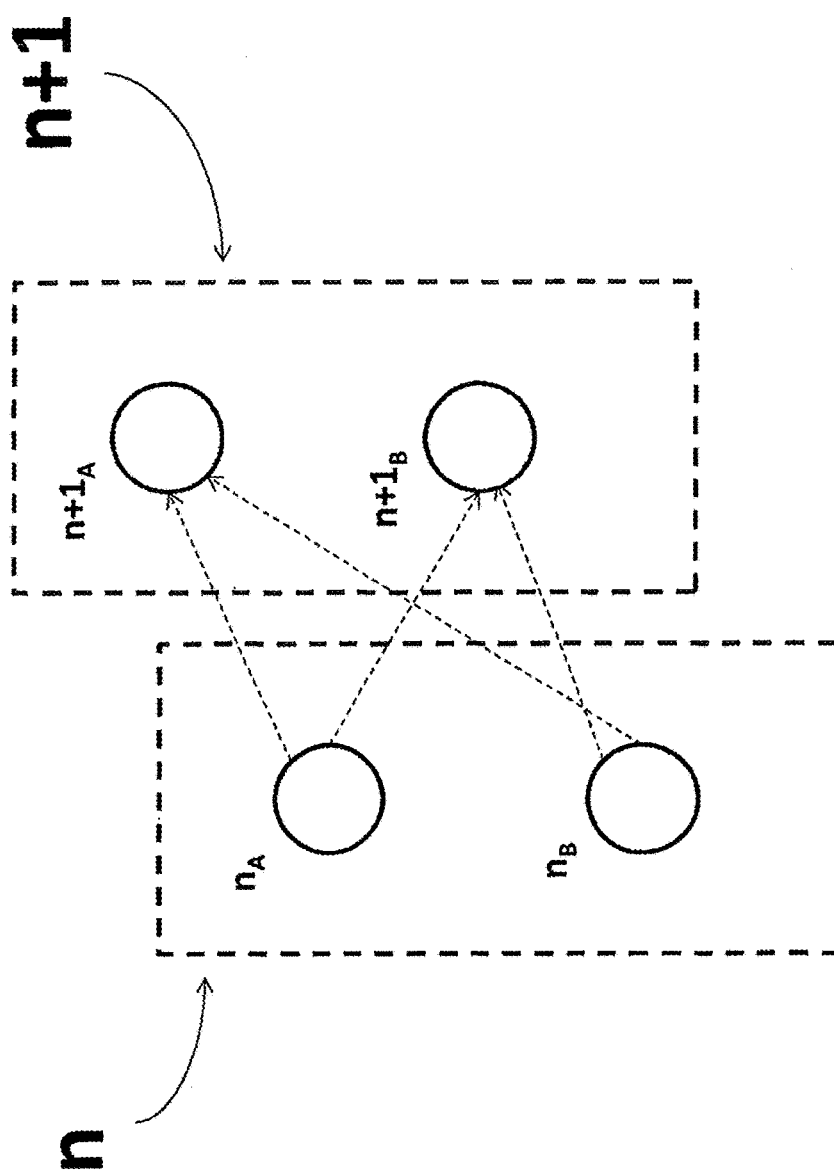
FIG. 1 schematically represents a sequence of two scenes of a film according to the method of reproduction of the present invention.

It is hereinafter referred to a "scene" of a film generally meaning an "event". An event of a film is an audio/visual content (or only visual in case of a silent film, although this type is currently seldom used) made by one or more cameras. The event can be accomplished by one or more cameras in which the recording takes place in a continuous manner over time, or by more subsequent recordings mutually separated wherein the various parts are subsequently mutually edited such to provide the viewer the sensation that the event has been recorded without interruptions.

In any case, and in a very general level, the reproduction of a film occurs when all the events of which it is composed are played in sequence. By way of a non-limiting example, an event of a film could correspond to a scene in which a character is walking in a park to reach a destination, for example a church.

A subsequent event could consist of a consecutive scene in which the protagonist is inside the church. In this case, therefore, the two events are distinct from each other because of the variation of environment relative to the two subsequent scenes. Differently, two events may be associated with two scenes filmed in the same location but characterized by a temporal variation, such as a flashback. In an even more general way, an event can be considered a portion of the film.

Accordingly, an event could also include more than one scene. During the filming of a movie, all events, each corresponding to one or more respective scenes as better explained above, are recorded on storage medium such as audio/visual file. As it is well known, all the material so produced during the filming is made available at a later stage for the post-production in which the scenes are edited, until the final product is achieved.

In this process, not all the available material is actually utilized. In fact, despite having shot a number of different takes (intended as single continuous recorded performances) during the filming for every single framing or dialogue scene with the same actors, in order to then be able to choose the best one, even having different images with which it would be possible to narrate a certain situation of the film in many ways, and even having several valid and different interpretations of the same lines provided by the actors, it is however necessary to choose a single image and a single acting, which will then form part of the film as traditionally intended.

It will be appreciated that this leads to the inevitable waste of all alternative options collected, not without effort, during the filming. Similarly, despite having for each scene numerous editing solutions, still a single version must be proposed.

Now, according to the method according to the present invention, the same event of the film, intended as a portion of it presented to the viewer during viewing, corresponds to multiple alternative events achieved by exploiting the different possibilities of subject, screenplay, acting and editing available for each event.

By way of a non-limiting example, resuming the above mentioned case, let's consider the event of the film where the protagonist is heading towards the church.

In a first event the protagonist, during the journey, comes across a character A. This scene is then shot and made available as audio/visual means as explained above. In a second event, alternative to the first one, the protagonist bumps into a character B, different from A. This second alternative event is recorded as well and stored as a file on a storage medium.

In a similar manner, once the protagonist reaches the church, in the first event the protagonist does not find anyone, while in a second event, alternative to the first one, the protagonist goes into the church during while a Mass is taking place.

With reference to FIG. 1, it is depicted a sequence of two subsequent events of a film reproduced according to the method object of the present invention.

In particular, it is schematically represented an event n and an event n+1 subsequent thereto. The first event n corresponds to respective alternative events $n_A$ and $n_B$, whilst event n+1 corresponds to respective alternative events $n+1_A$ e $n+1_B$.

As non-limiting case, with reference to the above mentioned example where the first event n corresponds to the protagonist traveling towards the church, while the second event n+1 is associated with the protagonist after reaching the church. In the alternative event $n_A$ the protagonist comes across character A, while in the alternative event $n_B$ the protagonist bumps into character B. With reference to the following event n+1, in the alternative event $n+1_A$ the protagonist finds the church empty, while in the alternative event $n+1_B$ in the church a Mass is being celebrated.

According to preferred embodiments of the present invention, the reproduction of the film includes a first step of reproducing on an audio/visual means the first event n, that is, in the above example the scene of the protagonist traveling to the church. The event n is automatically selected among alternative events $n_A$ (meeting subject A) and $n_B$ (meeting with subject B).

The method for reproduction includes a second step of reproducing the second event n+1, i.e. in the cited example the event associated with the scene in which the protagonist goes into the church. Similarly, the event n+1 is automatically selected among alternative events $n+1_A$ (the church is empty) and $n+1_B$ (a Mass is being celebrated).

In a general way, the method object of the present invention therefore allows, in the reproduction of the film comprising the two events n and n+1, four different combinations. With reference to the arrows shown in FIG. 1, the reproduction on the audio/visual means in sequence of the two events n and n+1 can have as a result the reproduction of:

1. Event $n_A$—event n+1 A (protagonist meets character A and arrives at the empty church);
2. Event $n_B$—event $n+1_A$ (protagonist meets character B and arrives at the empty church);
3. Event $n_A$—event $n+1_B$ (protagonist meets character A and arrives at the church while Mass is being celebrated)
4. Event $n_B$—event $n+1_B$ (protagonist meets character B and arrives at the church while Mass is celebrated).

During reproduction of the film, the selection of events, such as $n_A$ and $n+1_B$, occurs in such a way as to maintain logical coherence between subsequent events n and n+1. In other words, as it will be better explained below, the particular plot of the film, initially defined, may influence the automatic selection operated for the reproduction. Preferably, the selection of an event among the respective plurality of alternative events may take place in random or pseudo-random manner, according to the type of algorithm that is implemented to operate selections. The necessary knowledge for the development and implementation of such algorithms are considered to be within the reach of those who are skilled in the field, and therefore a detailed description will not be given in the specification of the present invention.

Figure 2:
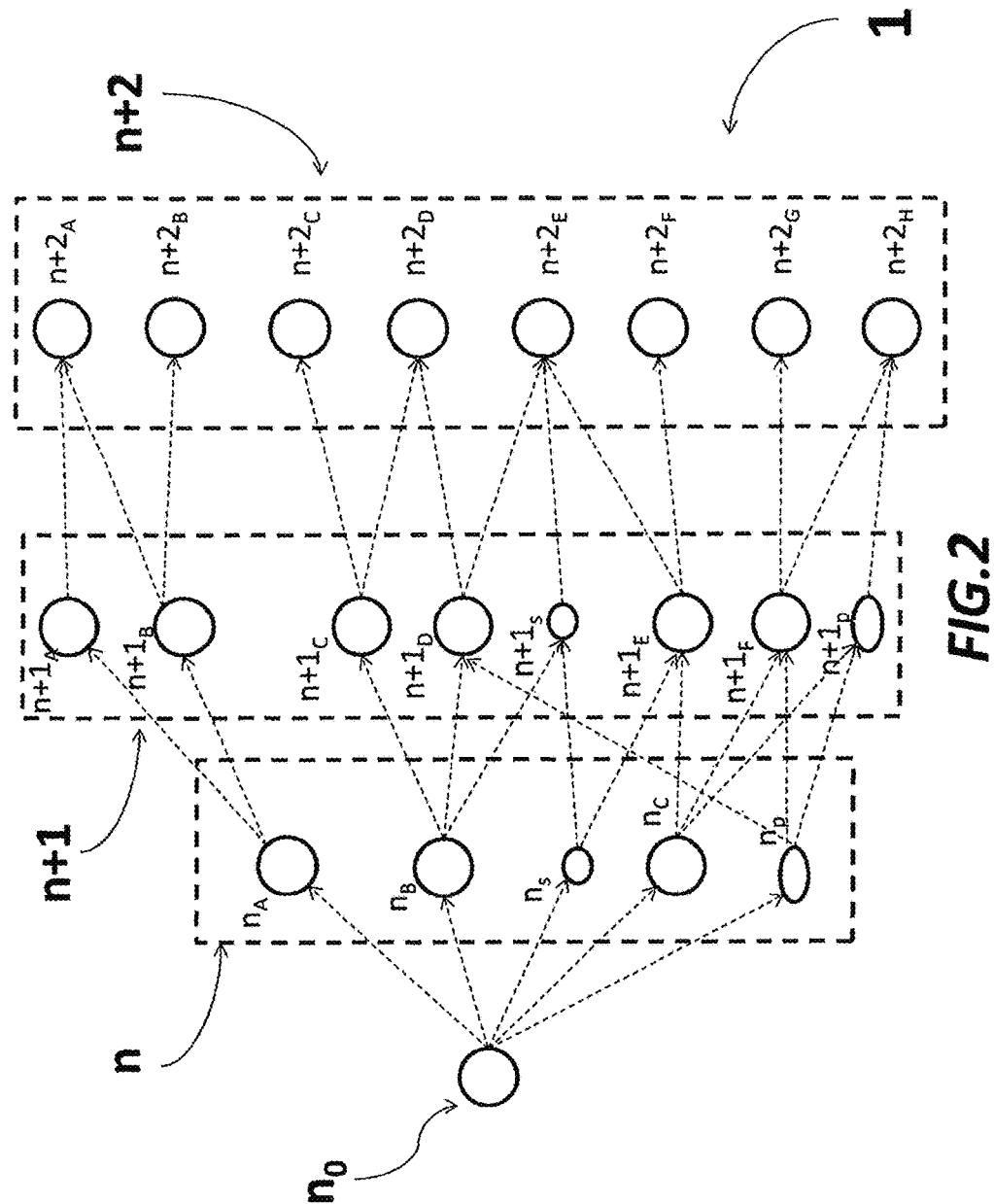
FIGS. 2 and 2A schematically represent architectures of scenes of a film, reproduced according to the reproduction method of the present invention.

Referring now to FIG. 2, an architecture of events 1 is schematically represented comprising events n0, n, n+1 and n+2, intended as audio/visual files usable for reproduction. The architecture of event 1 is substantially comparable to a tree structure where each event corresponds to a node in the structure. The tree structure 1 may also be understood as part of a larger structure, not shown for reasons of simplicity. Consequently, the event $n_0$, in turn, may be a selectable event from a plurality of respective alternative events (not shown).

With particular reference to the example of the figure, in order to operate the selection of two subsequent events so as to maintain the logical coherence between the same, the selection of event $n_A$ would be incompatible with the subsequent selection of the event $n+1_C$. For example, the event $n_A$ could be associated with the death of a character C, while in the event $n+1_C$ (coming from the previous event $n_B$ different from $n_A$) such character could be still alive.

As shown in the figure, the selection of the event $n_A$ results in the exclusion from the selection of events $n+1_C$-$n+1_F$. It is understood that the tree structure can have very different shapes, dependent on how the events and their respective alternative events are mutually arranged, FIG. 2 representing only a non-limiting example.

It will also be appreciated that possible unfolding of the film, that is the possible combinations of events subsequently reproduced, will increase with a non-linear trend with respect to the amount of available events. At the limit, even when the movie is reproduced several times with the same narrative path, the random or pseudo-random selection ensures the reproduction of different versions of each event along said narrative path.

It will be understood that the amount of available events substantially equals the amount of "cinematographic material" made available during the production of the film and/or subsequently processed in the editing phase.

For this reason, despite the work required for the making of a film according to the reproduction method of the present invention is greater than the one required for the production of a film according to the known art (as the various scenes must be conceived so as to trace multiple different story lines instead of one; for each scene more alternative events must be conceived; for each event containing a dialogue different variants of the same dialogues and\or thoughts\voiceovers must be provided; during filming of each scene different versions should be recorded so as to collect the largest amount of material that will then be further increased in post-production by means of different editing solutions), the possible variations of the film obtained are extremely numerous (in other words the film has a different unfolding practically in every viewing), as it is appears evident from the analysis of the tree structure 1 illustrated in FIG. 2. To improve viewer experience, the selection of the events can be based, at least in part, to a predetermined criterion.

It is to be intended for a single "viewing" of the film an entire string defined as a set of subsequently selected events in the manner described above, in which the first event reproduced corresponds to the opening scene of the film, while the last event correspond to the final scene of the film.

Preferably, the selection of each alternative event (in other words the selection of event $n+1_E$ instead of another) may advantageously be stored on a suitable support, such as a memory buffer, so as to create an historical archive of selected events during the subsequent viewings of the film. Said predetermined criterion can advantageously be associated with such historical selections previously operated.

According to preferred embodiments of the present invention, the events forming the multifilm include events of a first type and events of a second type. The method according to the invention provides correlations between events of the first type and of the second type, these correlations being configured in the manner explained below.

During the generation of strings of events associated of the multifilm, the events of the second type, indicated with $n_S$, are not accessible and therefore their selection is prohibited. This condition exists until, during the generation of a string A1, and associated with a respective viewing of the film, the selection includes at least one event of the first type, denoted by $n_P$. The event of first type $n_P$ is correlated to at least one event of the second type $n_S$, so that access and thus the viewing of the event $n_P$ in the string A1 now allows the selection of the event $n_S$ during the generation of a string of event A2, generated after the string A1 (and therefore associated with a different viewing of the film).

The viewing of an event of the first type $n_P$ may authorize, in the generation of subsequent strings, the selection of one or more events of the second type $n_S$ correlated thereto. Additionally or alternatively, the authorization of the selection of an event of the second type $n_S$ can only occur after the selection (even in different strings) of a plurality of events of the first type $n_P$.

Figure 2A:
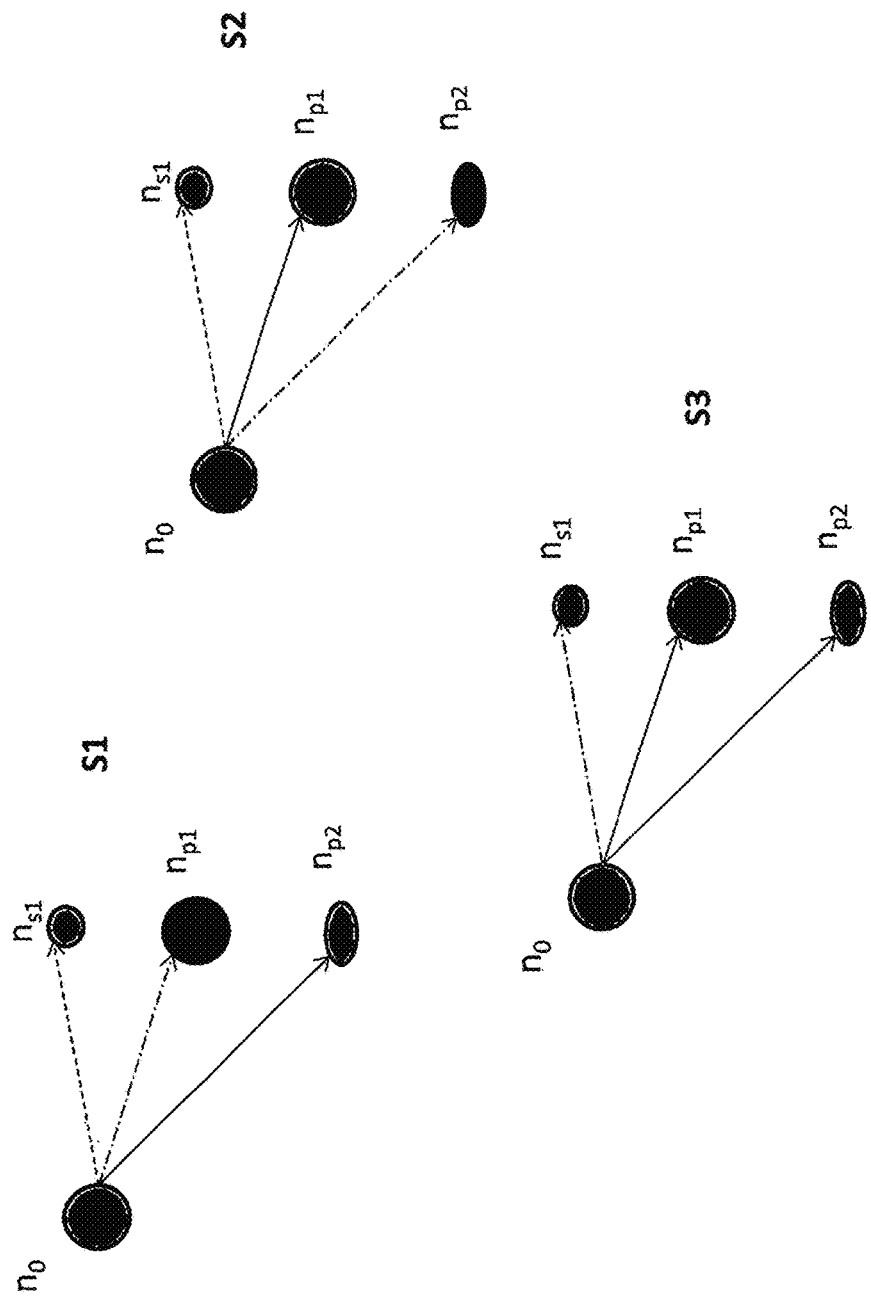

For example, making reference to FIG. 2A, if an event of the second type $n_{S1}$ is made accessible only after the viewing (and therefore selection) of events of the first type $n_{P1}$ and $n_{P2}$ correlated thereto, such a selection may also occur in subsequent strings. For example, the event $n_{P1}$ is selected in the string S1, while the event $n_{P2}$ during the generation of the S2. Therefore, the event $n_{S1}$ is selected in the generation of a string S3, subsequent to S2. In the FIG. 2A and subsequent FIGS. 3-6, arrows with a continuous line indicate selectable "authorized" events, arrows with dashed line events that are still blocked, that is "unauthorized", whilst arrows with dash-dot indicate an event which has been selected within the generation of the respective string.

In general, the correlations described above may exist between one or more events of the second type $n_S$ and one or more events of the first type $n_P$.

Still with reference to the example illustrated in FIG. 2 as a non-limiting case, the selection of one or more individual events of the second type, indicated in figure as $n_S$, $n+1_S$, can take place only upon the occurrence of one or more predetermined conditions. Such conditions may include the occurrence of the selection of some predefined individual events of the first type (indicated by way of example in the figure as np and $n+1_P$) during the generation of strings of previous viewings. So, as a result, some of the unfolding of the film will occur only when some predetermined content have already been revealed to the user in previous viewings.

Furthermore, advantageously, events of the second type $n_S$ only after having been unblocked by one or more events $n_P$ correlated thereto, may, in turn, be identified within the architecture of the multifilm as events of the first type $n_P$ the access of which will unblock, in turn, events of the second type $n_S$ correlated thereto. It will be appreciated that the existence of more levels of access of certain events of the second types $n_S$ enables, in an advantageous way, to develop an extremely complex narrative path and at the same time very gratifying for the viewer during the viewing of a plurality of strings of events, each one associated to a version of the film.

Figure 3:
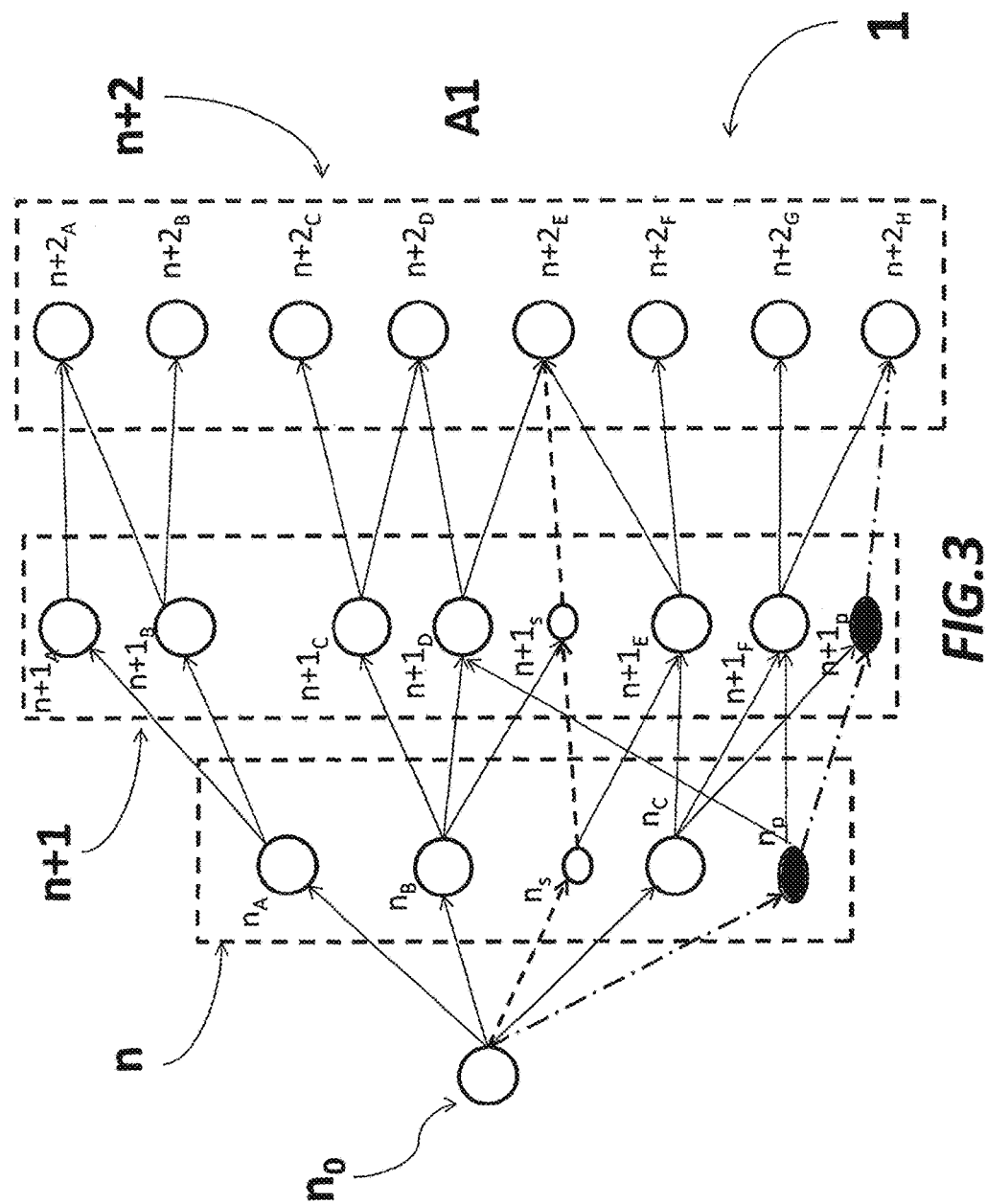
FIGS. 3-6 schematically represent the architecture of FIG. 2 according to preferred embodiments.

This concept is even better explained with reference to the subsequent FIGS. 3 and 4. In particular, during a first viewing A1 of the film, the individual events selected and reproduced on the audio/visual means, as detailed above, are stored on a memory buffer. In particular, the sequence of events during the first viewing A1 schematically represented in FIG. 3 includes the selection of the events of the first type $n_P$, $n+1_P$. The information associated with the selection of these individual events of the first type $n_P$, $n+1_P$ is then stored and used to operate the generation of new sequences of events in subsequent viewings of the film. During the generation of the string associated with the viewing of the film A1, selection of events $n_S$ e $n+1_S$ is not allowed (for this reason the corresponding arrows are dashed).

Figure 4:
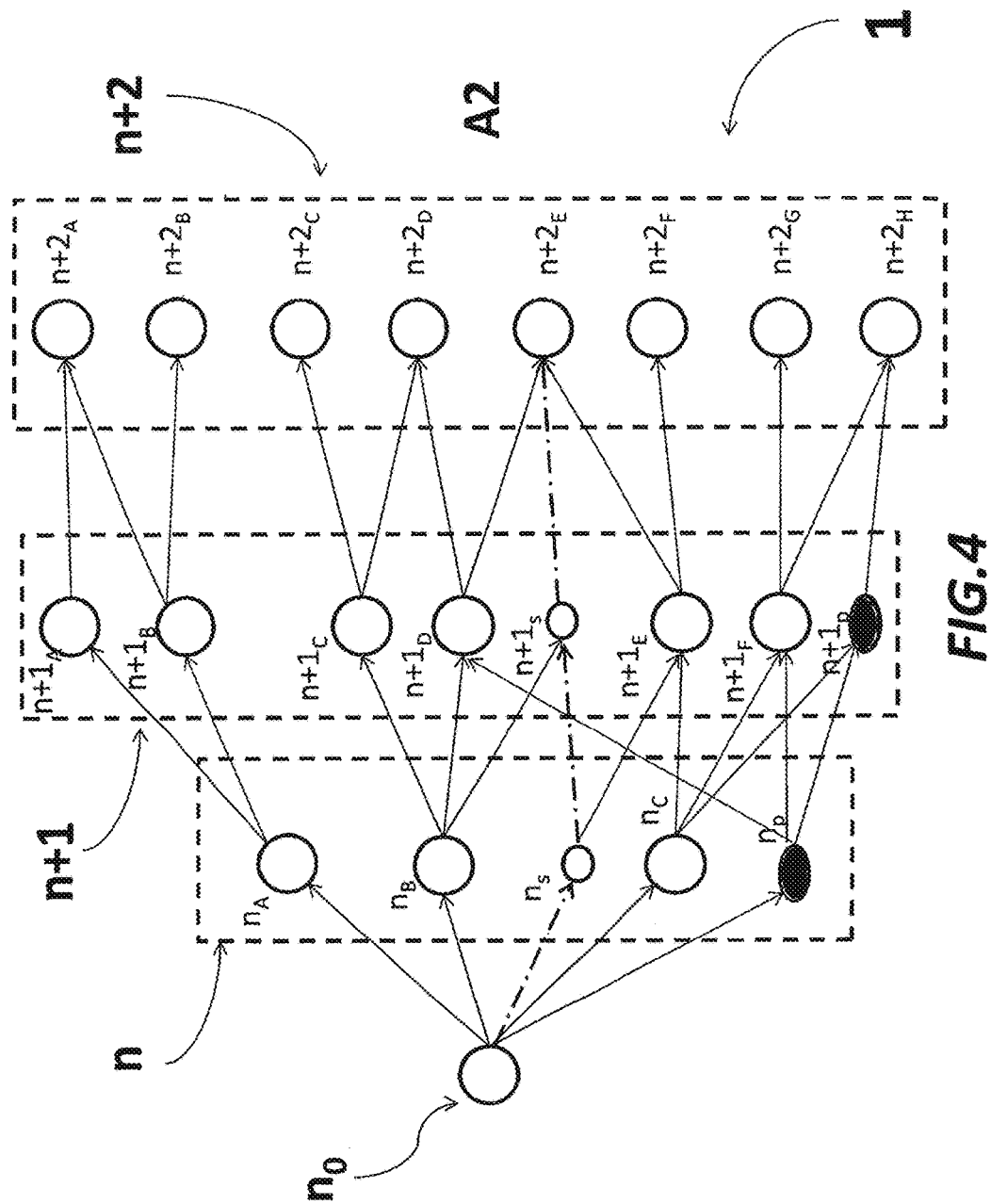

FIG. 4 shows a viewing A2 of the film, subsequent the viewing A1, in which the events of the second type $n_S$ and $n+1_S$ are selected and reproduced, since in the previous viewing A1 the individual "unblocking" events of the first type $n_P$, $n+1_P$ were selected and the information associated with their selection in the previous viewing is used for subsequent reproductions of the film (ie, a subsequent reproduction A2).

Therefore, in very general, the selection of one or more individual events of the first type during the generation of a string of events relating to a single viewing, makes accessible the selection of one or more predefined events of the second type correlated thereto during the creation of strings of events associated with subsequent viewings.

There are individual selectable events in a viewing of the film which "trigger the selection" of other events during subsequent viewings, which would otherwise remain inaccessible to the viewer. In this way it is possible to create narrative consistency not only in the single viewing of the film but also between subsequent viewings, ensuring that the plot can have a rationale, as well as being random, so that it can "evolve" between a subsequent viewings rather than changing without any coherent narrative path.

All along, any serial product takes advantage of the evolution of its characters during the episodes, despite proposing a narrative structure which is very similar among all episodes; thanks to this mechanism of "blocked" and "unlocking" events the multifilm (unlike the prior art) may also propose a story whose characters and situations evolve among subsequent viewings even in a context of a narrative path which remains substantially random.

This significantly improves the narrative experience by allowing the multifilm according to the invention to narrate a story in a random way whilst still preserving the advantage of normal serial product of being able to sort of its content between a viewing and the other, showing the viewer, in relation to characters or in general to situations of the film, events which leave unanswered questions which only after their viewing will lead to the generation of strings with explanatory events, for example firstly showing the weakness of a character and only after his strength, or firstly his defeats and only afterwards his victories.

Advantageously, such architecture allows to provide an event corresponding to a "grand finale" (an event in which "everything " ends and "everything " is explained) that marks the "end" of the narrative path associated with a plurality of subsequent viewings of the multifilm (beyond which the multifilm can still be viewed by providing new combinations of the same clips allegedly already enjoyed at least once by the viewer—unless it is wished to preserve the fruition of a substantial part of them to a second "cycle" of viewings going again from the first viewing to the grand finale, and so on in order to hold the interest potentially during several cycles of viewings).

This architecture involves a further benefit that has a substantial significance in that it enables to create without additional production costs (excluding costs related to a greater editing work of the same scenes, usually, however, insignificant compared to the result obtained) a substantial amount "extra" of audiovisual entertainment. From each realized audiovisual event it is possible to create several events in the form of different portions of the same, the sum of which being considerably longer than the original, and presenting them to the user such that he views contents already seen but always with the addition of something new.

For example, from an event lasting five minutes, it is possible to create an event (a) with the first minute, an event (b) with the first two minutes, an event (c) with the first three minutes, an event (d) with the first four minutes and finally an event (e) with the totality of the five minute originally available. Therefore by means of an event lasting five minutes it is possible to achieve a total of fifteen minutes of entertainment (it is also feasible employing editing solutions such that within the variations b, c, d and e, portions already seen are made different and/or faster).

This multiplication is only possible if the viewer sees the portions exactly in the order a, b, c, d, e; if, in fact, this were regulated by chance, the viewer could immediately see the full scene, but then viewing subsequently all its parts would not make any sense because the contents would have been already fully revealed. To this aim it is required that, at the first viewing of the multifilm, only versions "a" of each portion are accessible, that is reproducible, each of which, if selected, will unblock its own version "b" in subsequent viewings, which in turn will unblock version "c" and so on until the complete event is shown.

By applying this mechanism to virtually all the scenes of a multifilm, the benefit in terms of content optimization becomes extremely advantageous. The normal TV series often resort to flashbacks in an attempt to create entertainment with things already used. The multifilm instead takes advantage of "decomposing" from the start potentially any event which is available in several portions (the sum of which exceeds in length the original) and proposing these portions to the viewer in a certain order during subsequent viewings, ensuring a significant increase in the total duration of the narrative experience (and thus also of possible economic returns associated with it—the greater the "duration" or the number of episodes of a serial work, the greater the income that it will guarantee) while still preserving a correct balance between restituting to the viewer contents already experienced and contents never experienced before, during the course of different viewings.

In order to continuously push back—and in an evolved way—the full enjoyment of the narrative contents in subsequent viewings without which they would never be fully enjoyed by the viewer. This is a further incentive for the viewer to watch several viewings: if the contents were entirely available from the early viewings, viewer's interest may run out quickly.

According to the invention, the multifilm is able to create a narrative evolution in subsequent viewings, avoiding that subsequent viewings be somehow unbound exclusively depending on random or pseudo-random selection and reproduction of available events.

The above described innovative features advantageously allow, suitably arranging the multiple available plots at each reproduction of the film, that the film itself, and then its contents will gradually "evolve" with each viewing. In addition, to further enhance the viewer's experience during several viewings of the film and to avoid that previously selected events be selected and reproduced several times during subsequent viewings (thus making the experience less satisfying) an index of probability of selection i may be associated to each selectable event for reproduction, the index i being advantageously configured so as to decrease the probability of selection of the corresponding event as the number of operated selections of the same during subsequent viewings of the film increase.

Therefore, the probability of selection of an event during the generation of a first string A1, if selected, may decrease during the generation of a subsequent string of events A2. Advantageously, this avoids the risk of viewing several times an unblocking event (or of the first type) and never the event of the second type correlated thereto, furthermore there would be generally the risk to show always the same events not having access to others; instead, events already selected will become less probable during the generation of subsequent strings and thus selection of unseen events will be preferred.

It is understood that, according to the narrative development proposed with the multifilm, events can have an index of initial probability which can vary depending on the particular event, and similarly the variation of such index after one or more selections, in the generation of subsequent strings, can also vary depending on the particular event. For example, some events may have a probability index that can even remain constant during subsequent viewings of the film (if they correspond to a particularly significant content of the film).

In order to adjust the indices of the probability of each event, all the selections operated during the creation of subsequent strings are stored in a memory buffer, the buffer being thus used in the creation of subsequent strings for the regulation of the indices of the probability of each event.

The method object of the present invention can be employed for the reproduction of both films with real actors and of the animated kind. It will be appreciated that the realization phase of the events making up the multifilm is outside the scope of the present invention, both in case of cinematographic scenes filmed with real actors and cameras as described above, and events made with modern techniques of processing of the current animated film, or entirely made in computer graphics.

In relation to a cinematographic scene filmed with real actors, there are various ways to produce alternative events of the same. Some modalities are listed below:

1. Variants of the subject: the same scene is characterized by alternative events substantially different from each other. To cite the example mentioned above, the scene that depicts the protagonist walking around the park can be characterized by the encounter with a character A or with the character B.

2. Variants of the script: the alternative events have the same narrative content but differ in the form in which that content is expressed. For example, the same dialogue between two actors can be proposed in various forms, either by varying the content of the dialogue, or by proposing the same content with different expressions.

3. Variants of acting: the same scene or dialogues are acted in several different ways by the actor; each of these interpretations, as long as considered valid by the director, can be used as an alternative event. For this purpose, it is recommended, once properly prepared the scene, to invest more time in collecting different versions of the same because there will be no need to choose one of them thus wasting all the others, but all different variants considered valid will then be used as alternative events, leaving unused only the errors and unsuccessful interpretations.

4. Editing variants: the same scene is shot in a different manner, such as by means of different camera angles. Each different solution of editing of the same material then corresponds to a respective alternative event. For this purpose, it is advisable to carry out the shooting of the film with multiple cameras operating simultaneously to shorten production time and have more editing solutions.

In the production of audio-visual material according to traditional methods, two of the factors that usually contribute the most to increase the costs are the crew transfers (from one set to another) and the preparation of the scenes.

Making multiple versions of the same scene, once the scene has been properly prepared, involves significantly lower costs compared to the costs associated with the preparation of several different scenes. Similarly, drafting different dialogues and processing multiple editing solutions of the same scene does not cause costs which may considerably affect an audiovisual production.

Further object of the present invention is to provide an apparatus configured to perform the method for reproduction described above and a computer program comprising instructions that, when executed on a processor, implement this method. In particular, this program will have instructions, writable in any language, such as to identify a path (or string) of possible selectable events within the tree structure, thus allowing each subsequent reproductions of the film according to a respective path.

Then, the computer program, once drawn a particular path for the reproduction of the film, ensures that the selected events that make up that path are displayed in sequence on the audio/visual means. The necessary skills for writing and implementing those instructions (or code) are within the reach of a person skilled in the field, and then this will not be further described.

It is a further object of the present invention to provide a storage medium (such as a "DVD" or a "bluray") on which a tree structure of events as shown by way of example in FIG. 2 is stored. Such storage medium may also contain, advantageously, the program for the reproduction of the film. The storage thus produced can be deployed as a normal disk and be read by appropriate means provided with necessary hardware for reading and implementing the reproduction program necessary to achieve for each viewing a different unfolding of the film, as described above.

The technical knowledge for the realization of such a hardware configuration is also to be considered to be within the reach of those who are skilled in the art, and therefore it will not be given a detailed description of it.

It is also important to emphasize that in order to maintain logical consistency for the entire single viewing or string, necessarily, each individual node or event in the tree comprises a list of authorized subsequent nodes (which are referred to as "children"), that is events that are viewable immediately after said individual node, and a list of nodes which are subsequent to the children of said event, unauthorized and therefore not selectable for the entire string (which are referred to as "unwished grandchildren").

Figure 5:
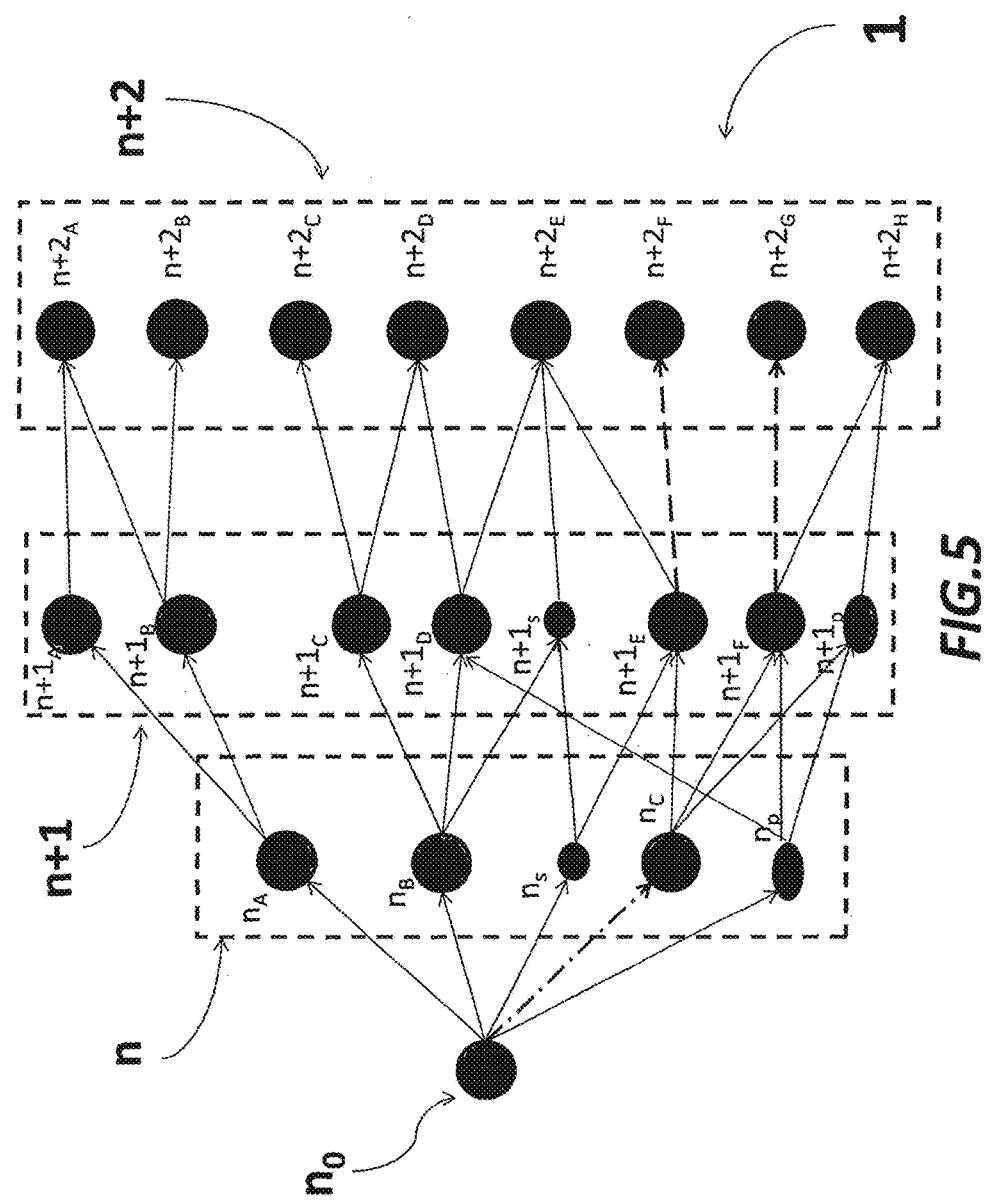

For example, referring to FIG. 5, the node or event $n_C$ will have as "children" events $n+1_E$, $n+1_F$ and $n+1_P$ and as "unwished grandchildren" events $n+2_F$ and $n+2_G$.

In this example, the event $n_C$ consists of a dialogue between a character X and a character Y in which the character X delivers the information C (as alternative to the information A, B, S and P enclosed in the events $n_A$, $n_B$, $n_S$ and $n_P$) to the character Y. The events "children" of $n_C$ ($n+1_E$, $n+1_F$ and $n+1_P$) consist of scenes in which the character Y searches for a character Z during which different situations might occur.

Subsequent events ($n+2_E$, $n+2_F$, $n+2_G$, $n+2_H$; children of $n+1_E$, $n+1_F$ and $n+1_P$) consist of an encounter and a dialogue between the character Y and the character Z in which reference is made to the dialogue that Y had with X at the beginning of the viewing. To maintain narrative coherence character Y, while in front of Z, will not, however, randomly refer to one of possible pieces of information (A, B, S, C and P) that could have obtained from X (in the events $n_A$, $n_B$, $n_S$, $n_C$ and $n_P$), but will refer exactly to piece of information C, gathered by the viewer during event $n_C$; therefore, starting from $n_C$, events where it is subsequently referred to pieces of information A, B, S and P, (in this case $n+2_F$ and $n+2_G$) will not be accessible as part of the same viewing.

Figure 6:
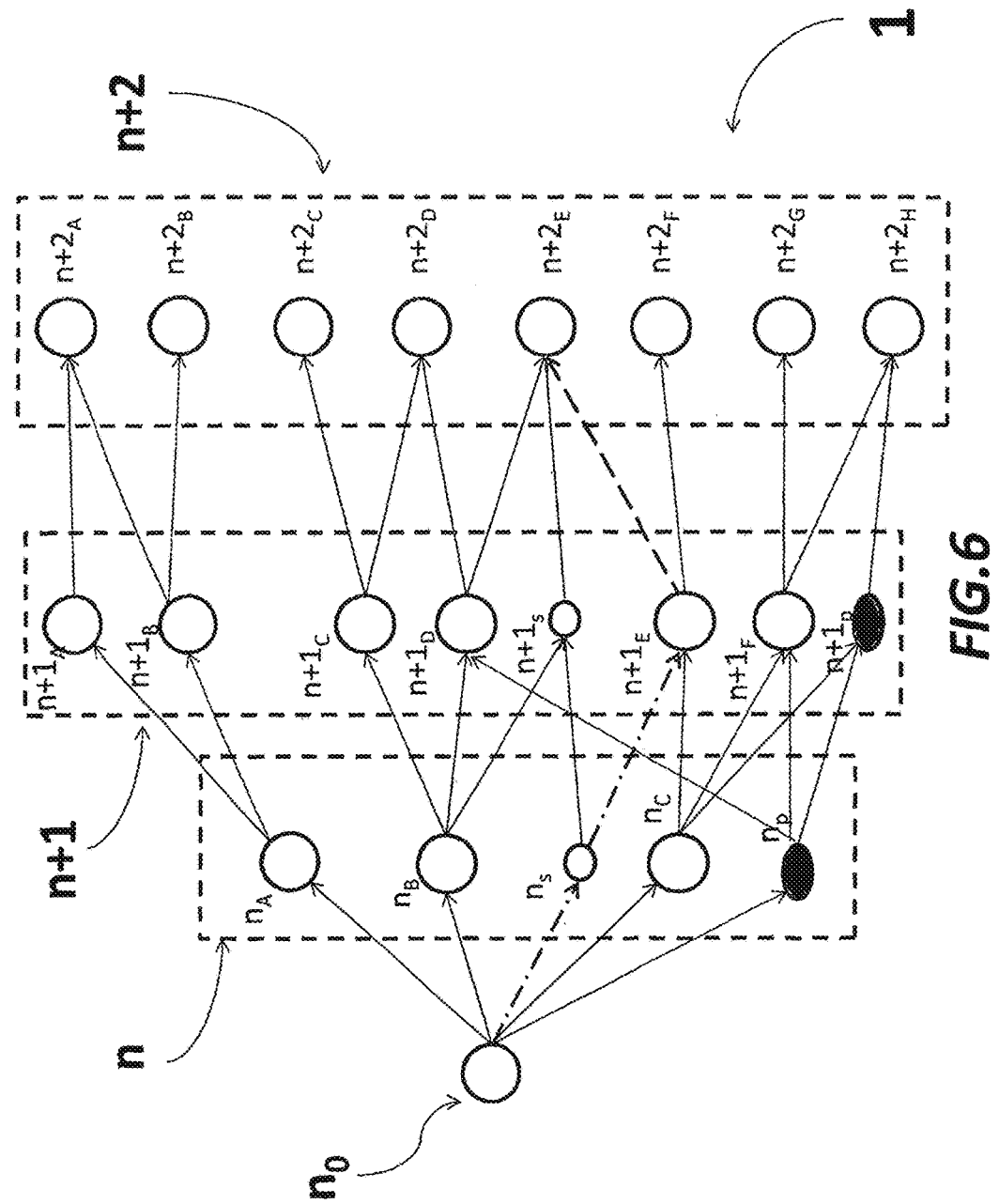

Finally referring to FIG. 6, it is to be noted that the connection father-son that leads from $n+1_E$ to $n+2_F$ is not useless, as it is perfectly active if the viewer at the previous node collects $n_S$ instead of $n_C$, since $n+2_F$ is not an "unwished grandson" of $n_S$, while $n+2_E$ is.

It is understood that certain events or alternative nodes may share the same list of "children" and "unwished grandchildren".

Finally, the computer program that implements the method of the present invention draws a sequence of events between several alternatives and then connects them restituting a whole movie to the viewer without interruptions. However there might be a problem of having an unpleasant sound attack between two events. Usually, after a normal film is edited, audio fades are applied between one event and another so as to avoid unpleasant audio transitions.

However, in a multifilm viewings are in turn assembled in a different way, and then it is required a function that, before rendering the single viewing, applies an audio fade to each attack between events. The events will be preferably left with an audio "tail" useful to produce the right effect, which can be ensured by a normal technician in the field (sound technician).

Other features of the multifilm according to preferred embodiments are listed below:

1) Each viewing can be displayed immediately after having been seen; it is possible to go back, pause and have normal controls provided on any audiovisual. The current viewing of the multifilm can also be saved, associated with a preference index, a title and/or comments. At the end of each viewing, a subsequent one can be generated.

2) It is possible to create a web-based platform associated with the user experience relative to one or more multifilm where it is provided a profile page with user's data and reports of all activities, such as messages from other users, replies to written posts on the forum/chat site, the rate of progress of the multifilm (that is how many events have been seen with respect to the total), data saved, comments, and everything may be published according to user's preferences.

Preferably, it will be provided a page shared by all the web-platform subscribers everyone will have the opportunity to publish or not publish data, multifilm progress, number of viewings, savings, comments, etc. . . .

3) If a user who has a few viewings of multifilm had access to the saved data of a user who has instead carried out many viewings, would run the risk to access events of which later on he will have to see their portions again, which would be disadvantageous. To overcome this, the software will be configured to prohibit a user with a low progress to access saved data of another user with higher progress.

In this regard, a level of "tolerance" may be established such to define the limits on the permitted previews of contents. For example, a published saved data of a "grand finale"—which of course can also exist in several different versions—cannot be seen by a user who has not yet reached in turn a "grand finale".

The present invention has hereto been described with reference to a preferred embodiment. It is to be understood that there may be other embodiments afferent to the same inventive concept, all falling within the scope of protection of the claims below.

The invention claimed is:

1. A method for the reproduction a film, comprising:
generating at least two strings of events (S1, S2, S3), each string of events (S1, S2, S3) being associated with a respective version of the film, wherein each string of events (S1, S2, S3) includes a sequence of at least a pair of events (n, n+1) in which each event corresponds to an audio/visual content recorded on a storage medium:
playing said first event (n) on an audio/visual means;
playing said second event (n+1) on the audio/visual means, subsequent to said first event (n);
said first (n) and/or second event (n+1) being selected for the reproduction automatically between a plurality of respective alternative events ($n_A$, $n_B$; $n+1_A$, $n+1_B$), said selection being effected in such a way to maintain logical coherence between said subsequent events (n, n+1), wherein the film includes events of a first type $n_p(n_{p1}, n_{p2})$ and second type $n_s(n_{s1})$ such that the selection of one or more events of the first type $n_p(n_{p1}, n_{p2})$ in one or more strings of events (S1, S2), authorizes the selection, during the generation of subsequent strings (S3), of one or more events of the second type $n_s(n_{s1})$ said selection of events of second type $n_s(n_{s1})$ being otherwise prohibited.

2. A method for the reproduction of a film according to claim 1, wherein said first (n) and/or second event (n+1) are selected among said plurality of respective alternative events ($n_A$, $n_B$; $n+1_A$,$n+1_B$)randomly or pseudo randomly.

3. A method for the reproduction of a film according to claim 2, wherein said first and/or second event (n+1) are selected among said plurality of respective alternative events ($n+1_A$, $n+1_B$) based, at least in part, on a predetermined criterion.

4. A method for the reproduction of a film according to claim 3, comprising:
storing the selection of said first (n) and/or second event (n+1) among said plurality of respective alternative events ($n_A$, $n_B$; $n+1_A$, $n+1_B$) to create a historical archive of events (n, n+1) selected and played, to be referenced during subsequent reproductions of said film.

5. A method for the reproduction of a film according to claim 4, wherein said predetermined criterion for the selection of the events (n, n+1) to be played is associated to said historical archive of previous selections.

6. A method for the reproduction of a film according to claim 4, wherein said predetermined criterion comprises the selection of one or more events ($n_s$, $n+1_s$) for their reproduction only upon the occurrence of one or more predetermined conditions.

7. A method for the reproduction of a film according to claim 3, wherein said conditions comprise the occurrence of the selection of one or more predefined events ($n_p$, $n+1_p$).

8. A method for the reproduction of a film according to claim 3, wherein each selectable event for reproduction is associated to a probability index of selection (s), said index (i) being configured so as to decrease the probability of selection of the corresponding event as the number of selections of the same during one or more reproduction of said film increases.

9. A method for the reproduction of a film according to claim 3, wherein each event (n, n+1) is associated to a cinematographic scene previously shot.

10. A method for the reproduction of a film according to claim 1, wherein said first and/or second event (n+1) are selected among said plurality of respective alternative events ($n+1_A$, $n+1_B$) based, at least in part, on a predetermined criterion.

11. A method for the reproduction of a film according to claim 10, comprising:
storing the selection of said first (n) and/or second event (n+1) among said plurality of respective alternative events ($n_A$, $n_B$; $n+1_A$, $n+1_B$) to create a historical archive of events (n, n+1) selected and played, to be referenced during subsequent reproductions of said film.

12. A method for the reproduction of a film according to claim 11, wherein said predetermined criterion for the selection of the events (n, n+1) to be played is associated to said historical archive of previous selections.

13. A method for the reproduction of a film according to claim 11, wherein said predetermined criterion comprises the selection of one or more events ($n_s$, $n+1_s$) for their reproduction only upon the occurrence of one or more predetermined conditions.

14. A method for the reproduction of a film according to claim 1, wherein said conditions comprise the occurrence of the selection of one or more predefined events ($n_p$, $n+1_p$).

15. A method for the reproduction of a film according to claim 1, wherein each selectable event for reproduction is associated to a probability index of selection (s), said index (i) being configured so as to decrease the probability of selection of the corresponding event as the number of selections of the same during one or more reproduction of said film increases.

16. A method for the reproduction of a film according to claim 1, wherein each event (n, n+1) is associated to a cinematographic scene previously shot.

17. An apparatus for the reproduction of a film, comprising means apt to perform a method according to claim 1.

18. A non-transitory computer readable medium storing computer program instructions which when executed by a computer programmed with the instructions causes the computer to perform a method for reproduction of a film, the method comprising:

generating at least two strings of events (S1, S2, S3), each string of events (S1, S2, S3) being associated with a respective version of the film, wherein each string of events (S1, S2, S3) includes a sequence of at least a pair of events (n, n+1) in which each event corresponds to an audio/visual content recorded on a storage medium:

playing said first event (n) on an audio/visual means;

playing said second event (n+1) on the audio/visual means, subsequent to said first event (n);

said first (n) and/or second event (n+1) being selected for the reproduction automatically between a plurality of respective alternative events ($n_A$, $n_B$; $n+1_A$, $n+1_B$), said selection being effected in such a way to maintain logical coherence between said subsequent events (n, n+1), wherein the film includes events of a first type $n_p(n_{p1},n_{p2})$ and second type $n_s(n_{s1})$ such that the selection of one or more events of the first type $n_p(n_{p1}, n_{p2})$ in one or more strings of events (S1, S2), authorizes the selection, during the generation of subsequent strings (S3), of one or more events of the second type $n_s(n_{s1})$ said selection of events of second type $n_s(n_{s1})$ being otherwise prohibited.

* * * * *